(12) United States Patent
Rymer et al.

(10) Patent No.: US 12,387,199 B2
(45) Date of Patent: Aug. 12, 2025

(54) GENERATING AND MAINTAINING DIGITAL TOKENS ON A BLOCKCHAIN USING PHYSICAL DEVICE IDENTIFIERS

(71) Applicant: LITH LLC, Dallas, TX (US)

(72) Inventors: Andrew Rymer, Dallas, TX (US); Adam Roorda, Burbank, CA (US); Ronald Steelman, Northlake, TX (US)

(73) Assignee: LITH LLC, Dallas, TX (US)

( * ) Notice: Subject to any disclaimer, the term of this patent is extended or adjusted under 35 U.S.C. 154(b) by 75 days.

(21) Appl. No.: 18/108,104

(22) Filed: Feb. 10, 2023

(65) Prior Publication Data

US 2024/0062190 A1 Feb. 22, 2024

Related U.S. Application Data

(60) Provisional application No. 63/309,275, filed on Feb. 11, 2022.

(51) Int. Cl.
*G06Q 20/00* (2012.01)
*G06Q 20/36* (2012.01)
*H04L 9/00* (2022.01)

(52) U.S. Cl.
CPC ........... *G06Q 20/3672* (2013.01); *H04L 9/50* (2022.05); *H04L 2209/56* (2013.01)

(58) Field of Classification Search
CPC .. G06Q 20/3672; G06Q 20/409; G06Q 20/36; H04L 9/50; H04L 2209/56

USPC ................. 705/16, 21, 59; 380/44, 262, 278
See application file for complete search history.

(56) References Cited

U.S. PATENT DOCUMENTS

| 2019/0188704 A1 | 6/2019 | Grendon et al. |
| 2020/0097950 A1 | 3/2020 | Thompson |
| 2021/0110390 A1* | 4/2021 | Janaudy ............. G06Q 20/4016 |
| 2021/0326852 A1 | 10/2021 | Yantis et al. |

OTHER PUBLICATIONS

Taiwan Office Action issued to Application No. 112104979 on Sep. 13, 2024 in 18 pages.

* cited by examiner

*Primary Examiner* — Dante Ravetti
(74) *Attorney, Agent, or Firm* — Patterson + Sheridan, LLP

(57) ABSTRACT

Certain aspects of the present disclosure provide techniques for generating digital tokens associated with an asset on a blockchain. An example method generally includes receiving a request to create a digital token corresponding to an asset. A first private key is received. This first private key may be associated with a wallet in which the digital token is to be stored. A second private key is received from a physical device associated with an owner of the asset. An address of the asset is encrypted with a public key associated with the second private key. Metadata associated with the digital token is encrypted with a public key associated with the first private key. The digital token is minted on a blockchain based on the encrypted address of the asset and the encrypted metadata.

18 Claims, 6 Drawing Sheets

GENERATING AND MAINTAINING DIGITAL TOKENS ON A BLOCKCHAIN USING PHYSICAL DEVICE IDENTIFIERS

CROSS-REFERENCE TO RELATED APPLICATIONS

This application claims benefit of and priority to U.S. Provisional Patent Application Ser. No. 63/307,275, entitled "Generating and Maintaining Digital Tokens on a Blockchain Using Physical Device Identifiers," filed Feb. 11, 2022, and assigned to the assignee hereof, the entire contents of which are hereby incorporated by reference.

INTRODUCTION

Aspects of the present disclosure relate to digital tokens that correspond to other assets, and more specifically to the generation and maintenance of digital tokens on a blockchain.

BACKGROUND

Distributed ledgers, such as blockchains, hash chains, and other ledger systems, generally provide mechanisms for tracking a transaction history associated with a physical or digital object. A distributed ledger may structure a transaction history for an object as a plurality of nodes ordered sequentially. An original transaction in the distributed ledger, representing the creation of the object, may be a node that does not point to any other node in the distributed ledger as a predecessor node. Subsequent transactions may be reached by traversing pointers from the node representing the original transaction to a node representing any specific transaction. Using the distributed ledger, transactions may be processed by ensuring that the object identified in a transaction exists in the distributed ledger (e.g., to verify that an object exists and/or is a valid object against which transactions may occur) and to ensure that the participants in a transaction are entitled to perform the transaction.

In some cases, these distributed ledgers can be used to maintain transaction histories for digital tokens that may be associated with other (physical or virtual) assets. Generally, transferring ownership of these assets may include transferring both the underlying asset and the digital token associated with that asset. A transfer of a digital token may generally be effectuated by transferring a token from the current owner's wallet to the new owner's wallet based on encryption keys associated with the current owner and the new owner. However, when information about the underlying asset associated with the digital token is stored in an unencrypted format or encrypted using a compromised encryption key, it may be possible for malicious or unauthorized users to access and replicate the underlying asset.

Accordingly, techniques are needed to securely generate and maintain digital tokens on a blockchain.

BRIEF SUMMARY

Certain embodiments provide a computer-implemented method for generating digital tokens associated with an asset on a blockchain. An example method generally includes receiving a request to create a digital token corresponding to an asset. A first private key is received. This first private key may be associated with a wallet in which the digital token is to be stored. A second private key is received from a physical device associated with an owner of the asset. An address of the asset is encrypted with a public key associated with the second private key. Metadata associated with the digital token is encrypted with a public key associated with the first private key. The digital token is minted on a blockchain based on the encrypted address of the asset and the encrypted metadata.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
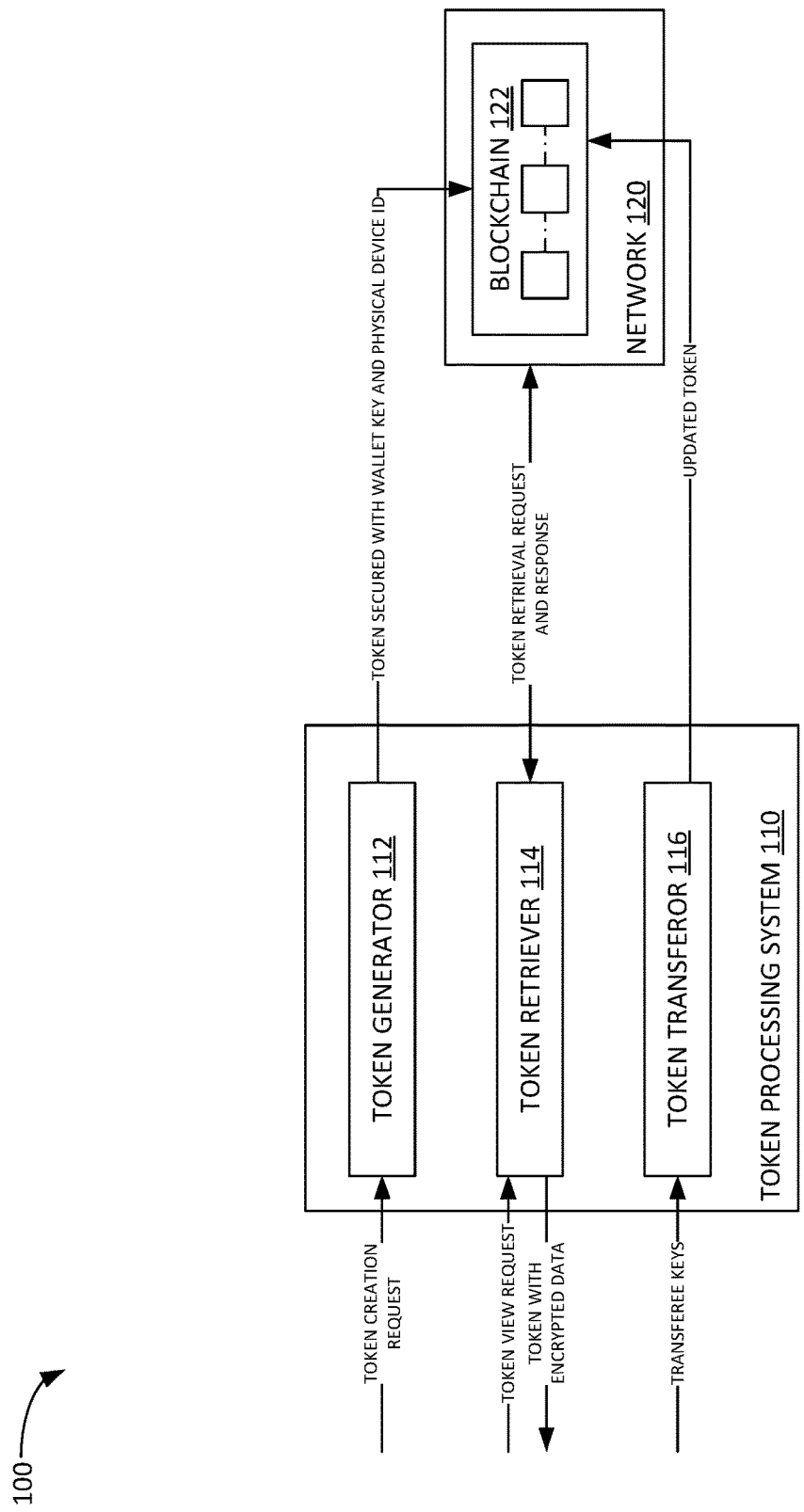
FIG. 1 illustrates an example system in which digital tokens corresponding to other assets are generated and maintained based on physical device identifiers.

Digital tokens stored on a blockchain generally allow for the maintenance and transfer of ownership of various assets in a traceable manner. These tokens may be non-fungible tokens (NFTs), or unique tokens representing ownership of a specific asset, such as a specific piece of artwork, a ticket to an event, specific data, or the like, which may not be divided into smaller portions or interchanged with other tokens. Because these tokens may not be interchangeable with other tokens, various steps may be taken to prevent replication of these tokens. For example, information in the token may be encrypted using encryption systems so that only the owner of the token can access the token. For example, public-private key encryption systems generally allow for the digital tokens to be encrypted using the owner's public key so that only a party with the owner's private key can decrypt the digital token and view its content.

Compromise of the owner's private key may, however, allow for malicious or unauthorized users to access a digital token, perform an unauthorized transfer of the digital token to another user, generate unauthorized copies of the digital token, or the like. For example, if a digital token corresponding to a piece of digital artwork includes information identifying the location of the piece of digital artwork (e.g., a uniform resource locator (URL) or uniform resource identifier (URI)) and the digital token is encrypted using a compromised key, a malicious user can access the underlying piece of digital artwork and effectively counterfeit the piece of digital artwork. By performing unauthorized transfers of a digital token or counterfeiting the underlying asset, the link associating ownership of the digital token with ownership of the underlying asset, whether physical or digital, may be broken. In another example, if a digital token encrypted using a compromised key includes sensitive information, a malicious user can access this sensitive information and use the sensitive information for unauthorized or malicious purposes.

Aspects of the present disclosure provide techniques for securely generating and maintaining digital tokens. As discussed in further detail herein, digital tokens may be generated based on data encrypted using multiple encryption keys. One of these encryption keys may be the public key corresponding to a private key associated with an owner of an asset associated with the digital token, and another one of these encryption keys may be a public key corresponding to a private key from a physical device associated with the owner of the asset. Different information in the digital token can be encrypted using different keys, and thus, if one key is compromised, only a portion of the data in the digital token may be compromised, and other data in the token may be protected. For example, if the key used to encrypt the metadata in the digital token is compromised, but the key used to encrypt the address at which the asset is located is not compromised, a malicious party may not be able to access and copy the underlying asset associated with the digital token or create a token with a valid reference to the address at which the asset is located. By generating digital tokens using multiple keys, aspects of the present disclosure can improve the security of digital tokens stored on a blockchain, as multiple keys may be needed to compromise a digital token. Because compromising multiple keys may be a computationally inefficient process (e.g., a brute force attack on a 128-bit key would require 2 128=3.4E38 decryption attempts), the use of multiple keys may increase the computational expense of breaking the encryption used on the data stored in a digital token such that doing so would be impracticable at best.

Example Generation and Maintenance of Digital Tokens Based on Physical Device Identifiers FIG. 1 illustrates an example computing environment 100 in which digital tokens corresponding to other assets are generated and maintained using physical device identifiers as one key in a set of keys used to encrypt the data within a digital token. As illustrated, computing environment 100 includes a token processing system 110 and a network 120.

Token processing system 110 generally allows for the generation, retrieval, and transfer of digital tokens using multiple encryption keys to protect the security of the data stored in a digital token. Generally, token processing system 110 may be any computing device that can generate digital tokens and generate corresponding blocks in a blockchain to evidence the creation and/or transfer of a digital token and assets associated with the digital token, such as a server, a compute cluster, desktop computers, laptop computers, mobile computing devices, edge computing devices, or the like. For example, token processing system 110 may be configured to process transactions for a cryptocurrency network, such as network 120. By way of example, network 120 may be an Ethereum® network or other cryptocurrency network on which smart contracts can be defined and executed for the generation of unique digital tokens corresponding to ownership or control over an associated asset. As illustrated, token processing system 110 includes a token generator 112, a token retriever 114, and token transferor 116.

Token generator 112 generally uses a key associated with a digital wallet of the owner of an asset and a key associated with a physical device owned by the owner of the asset to generate (or "mint") a digital token corresponding to the underlying asset. The generated (or "minted") token may be committed to the digital wallet of the owner of the asset, and a corresponding record may be recorded on a blockchain to evidence the creation and initial ownership of the digital token and the underlying asset.

A user can request generation of a digital token associated with an asset—whether physical or digital—by providing information about the underlying asset, a first private key, and a second private key. As discussed in further detail below, the first private key may be associated with a wallet owned by the owner of the asset, and the second private key may be associated with a physical device owned by the owner of the asset.

In some aspects, the asset for which a digital token is to be generated may be a digital asset, such as digital artwork, digital event tickets, digital audio and/or video files, sensitive data used to generate publicly-facing reports (e.g., environmental, social, and governance (ESG) reports), or the like. Digital assets may be stored separately from digital tokens stored on blockchain 122 (e.g., stored "off-chain"), and the information about the underlying asset may include information identifying a location at which the digital asset is stored. For example, these digital assets may be identified by a uniform resource locator (URL) at which the digital asset is stored, a uniform resource identifier (URI), a content identifier in a distributed file system (e.g., Interplanetary File System (IPFS) or the like), and so on.

In other aspects, the asset for which a digital token is to be generated may be a physical asset. The information about the physical asset used to generate the digital token evidencing ownership of such an asset may include various digital counterparts to the physical asset, such as a picture of the physical asset, a digital file including identifying information of the physical asset, or the like. Where a digital counterpart exists for the physical asset, the information about the underlying asset may, similarly to a digital asset, identify a location at which the digital asset is stored. In some aspects, where no digital counterpart exists for the physical asset, the information about the underlying asset may include information that can be used to access the physical asset, such as a security code, a lock combination, etc.

Token generator 112 may prompt a user, in response to a request to generate a digital token corresponding to an asset, to provide a first private key for use in encrypting metadata associated with the digital token. The first private key may be a private key associated with a wallet in which the digital token is to be stored. Token generator 112 can subsequently generate a corresponding first public key using various key generation algorithms such that any data encrypted using the first public key is decryptable using the first private key (e.g., the private key associated with the wallet in which the digital token is to be stored). In some aspects, token generator 112 may generate a unique public key for each digital token generated by token generator 112.

Token generator 112 may also prompt a user, in response to the request to generate the digital token, to provide a second private key for use in encrypting information about the location at which the asset corresponding to the digital token is located. As with the first private key, the second private key may be used in conjunction with various key generation algorithms to generate a second public key that can be used to encrypt information about the location at which the asset corresponding to the digital token is located.

In some aspects, the second private key may be retrieved from a physical device associated with an owner of an asset. To obtain the second private key, token generator 112 may provide a prompt to request that a user scan or otherwise digitally read or input a physical identifier from the physical device. The physical identifier may be scanned or read, via various data connections between the physical device and a device used to invoke a token generation process at token generator 112 (e.g., a mobile phone, laptop computer, desktop computer, etc.). For example, the physical identifier may be read via a Near Field Communication (NFC) data connection with the physical device associated with the owner of the asset, read from a Radio Frequency Identifier (RFID) module (e.g., RFID tag) embedded in the physical device, via a Bluetooth® Low Energy (BLE) connection with the physical device, or other wired or wireless (e.g., contactless) data connection between the physical device and the device used to invoke the token generation process.

In some aspects, token generator 112 may allow a user to manually enter and/or select a physical identifier associated with the physical device. For example, token generator 112 can allow a user to input data such as a serial number of the physical device, an identifier of a subscriber identification module (SIM) associated with the physical device (e.g., an Integrated Circuit Card Identification (ICCID) number), an International Mobile Equipment Identity (IMEI) associated with the physical device, an identifier of an RFID module associated with the physical device, or the like. It should be recognized, however, that these are merely examples of various identifiers that can be provided as a physical identifier, and other unique device identifiers can also or alternatively be provided as the second private key.

After token generator 112 generates the first public key (which corresponds to the first private key) and the second public key (which corresponds to the second private key), the data to be embedded in the digital token may be encrypted. Metadata describing the digital token may be encrypted using the first public key, and the location of the asset associated with the digital token may be encrypted using the second public key. The metadata describing the digital token may, for example, include information defining various attributes that describe the unique character of the digital token and the underlying asset. For example, in a scenario where a digital token corresponds to a playable character in a video game, the metadata describing the digital token may include information about the appearance of the playable character, gameplay attributes for the playable character, an inventory of items that the playable character can carry, and the like. In another example, in a scenario where a digital token corresponds to a report generated from sensitive (e.g., market sensitive) information, the metadata describing the digital token may include various data points derived from the sensitive information, such as ESG score data derived from sensitive information, internal equity or debt ratings derived from market sensitive data, or the like. Meanwhile, the location at which the asset corresponding to the digital token is located may be encrypted using the second public key so that even if the first public key is compromised, a malicious user would not practically be able to obtain, modify, and/or transfer the underlying asset associated with the digital token.

After encrypting the metadata and the location (or address) of the underlying asset associated with the digital token, token generator 112 can mint the digital token on the blockchain. The digital token generally includes the encrypted metadata and the encrypted address. In minting the digital token, token generator 112 can invoke a smart contract on blockchain 122 to create the digital token and concurrently generate a record evidencing the creation of the digital token on the blockchain and initial ownership of the digital token by the wallet owner whose private key can be used to decrypt the digital token. In minting the digital token on blockchain 122, the digital token may be stored on the blockchain 122, and the underlying assets associated with the digital token may be maintained in a separate location from the blockchain 122.

Token retriever 114 generally allows a user to view a previously minted digital token. To provide a digital token to the user for viewing, token retriever 114 may request an identifier of the digital token and retrieve the digital token from blockchain 124. The retrieved digital token may include the encrypted location at which the underlying asset is located and the encrypted metadata, which, as discussed above, may be encrypted using different keys to provide for the security of the metadata in the digital token and the location at which the underlying asset is stored.

To allow a user to view the underlying asset associated with the digital token, token retriever 114 can request the second private key from the user. Upon receipt of the second private key (which, as discussed above, may be read via a wired or wireless connection with the physical device associated with the owner of the asset or may be manually entered), token retriever 114 can decrypt the location of the underlying asset and provide the location of the underlying asset to the user viewing the digital token. The metadata may also be provided to the viewer in an encrypted form, and the user can decrypt the metadata using the first private key. Generally, the data included in or associated with a digital token may be transmitted from token processing system 110 to a client device (not pictured) in an encrypted format and decrypted locally (at the client device) so that decrypted data is not at risk of exfiltration while in transit. In some aspects, the keys needed to decrypt the location data in the digital token and the metadata in the digital token may be provided to token retriever 114 from a client device via various key exchange mechanisms, and the digital token may be decrypted. The decrypted digital token may then be re-encrypted using a different (mutually agreed upon) set of keys, which may allow for the information in the digital token to be secured while in transit.

Token transferor 116 generally facilitates the on-chain transfer of digital tokens and the underlying assets from an initial owner to a subsequent owner. To transfer a digital token (and the underlying asset), the transferor can view and unlock the digital token via token retriever 114 and initiate the transfer process. Token transferor 116 can then request a set of keys associated with the transferee (e.g., the user to whom ownership of the digital token and the underlying asset is to be transferred) for use in encrypting the metadata and the location information in the digital token. The requested set of keys may, in some aspects, include a public key associated with the wallet into which the digital token is to be transferred and a public key associated with a physical device owned by the transferee. After receiving the requested set of keys, token transferor 116 can encrypt the metadata using the public key associated with the wallet into which the digital token is to be transferred and can encrypt the location of the underlying asset using the public key associated with the physical device owned by the transferee. Subsequently, the updated token—which is now readable by anyone who has the transferee's private keys, but unreadable by the previous owner—may be persisted to blockchain 122 to evidence the transfer of ownership.

In some aspects, token transferor 116 may function as an intermediary to coordinate the transfer of a digital token and the underlying assets from a current owner (the transferor) to a new owner (the transferee). In such a case, token transferor 116 may receive information identifying the transferor and transferee and initiate the process to obtain the appropriate encryption and decryption keys separately. For example, token transferor 116 may request the private keys from the current owner of the digital token separately from requesting the public keys from the new owner of the digital token. By separately requesting these keys, token transferor 116 may prevent the new owner of the digital asset from obtaining the current owner's private keys and thus may prevent the current owner's other digital tokens from being compromised by the new owner. Further, the current owner of the digital token may not have access to the new owner's public keys, which may prevent the current owner of the digital token from creating new tokens using the new owner's public keys.

Figure 2:
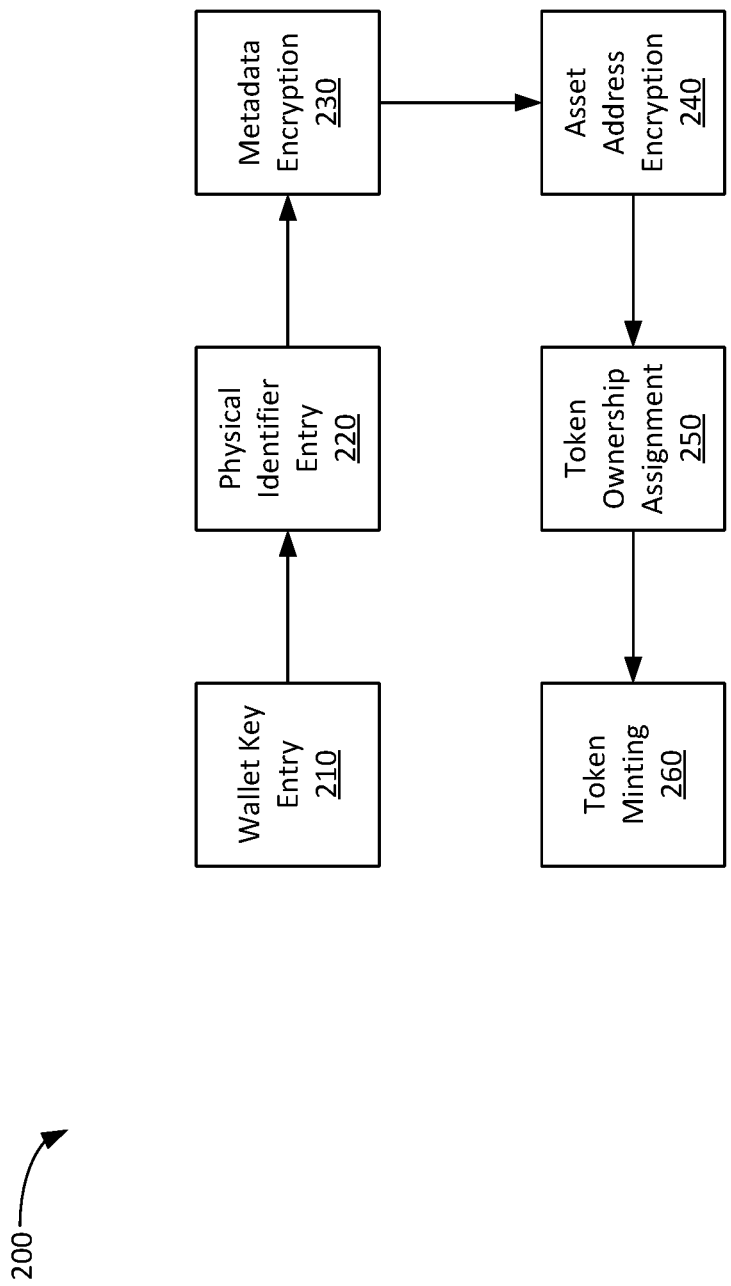
FIG. 2 illustrates an example pipeline for generating a digital token based on a physical device identifier.

Example Pipeline for Generating Digital Tokens on a Blockchain Based on Physical Device Identifiers FIG. 2 illustrates an example pipeline 200 for generating digital tokens on a blockchain, according to aspects of the present disclosure.

As illustrated, pipeline 200 begins with wallet key entry stage 210. At wallet key entry stage 210, the user who is creating a digital token corresponding to an asset provides a private key associated with the wallet into which the digital token is to be deposited. A token generator (e.g., token generator 112 illustrated in FIG. 1) can prompt the user for a private key, which the user may provide by typing in the private key, scanning a physical device on which the private key is stored, or the like. After the token generator receives the private key associated with the wallet into which the digital token is to be deposited, the token generator can generate the public key (e.g., an encryption key) using various key generation mechanisms that can generate a public key from a private key.

Pipeline 200 may proceed to physical identifier entry stage 220. At physical identifier entry stage 220, the token generator can request a physical identifier of a physical device owned by the owner of the digital token and the underlying asset for use in generating the digital token. A public key associated with the physical device may be derived from the physical identifier using various key generation mechanisms, treating the physical identifier as the private key that can be used to decrypt data encrypted using the public key derived from the physical identifier. The physical identifier may be provided, for example, via reading the identifier from the physical device using a wired or wireless data connection or via manual entry of the identifier. As discussed, the identifier may be read from various short-range data connections such as an NFC connection, via reading an RFID tag, via a BLE connection, or the like. In some aspects, the identifier may be an identifier associated with a SIM (e.g., an ICCID number), a serial number associated with the physical device, or the like. It should be noted that the physical identifier may be any sort of globally unique identifier that uniquely identifies a physical device owned by the owner of the asset and digital token.

At metadata encryption stage 230, the token generator encrypts the metadata carried in the digital token. As discussed, the metadata may be encrypted using the public key derived from or otherwise associated with the private key of the digital wallet.

At the asset address encryption stage 240, the location (or address) of the asset corresponding to the digital key is encrypted. As discussed, the location (or address) may be encrypted using the public key derived from the physical identifier.

At token ownership assignment stage 250, a record indicating ownership of the token may be generated.

Finally, at token minting stage 260, the digital token is minted and persisted to a blockchain. The digital token may be minted using the encrypted metadata and the encrypted address information so that multiple keys are needed to decrypt the content of the digital token and access the underlying asset corresponding to the digital token. At token minting stage 260, the digital token may be minted by invoking one or more smart contracts on a blockchain (e.g., blockchain 122 illustrated in FIG. 1) that cause a record to be generated on the blockchain evidencing the creation of the digital token and initial assignment of ownership of the digital token to the owner whose wallet private key was provided at wallet key entry stage 210. The digital token minted and stored on blockchain 122 may subsequently be retrieved and transferred, as discussed above, using the private key associated with the owner's wallet and the physical identifier of the owner's physical device.

Figure 3:
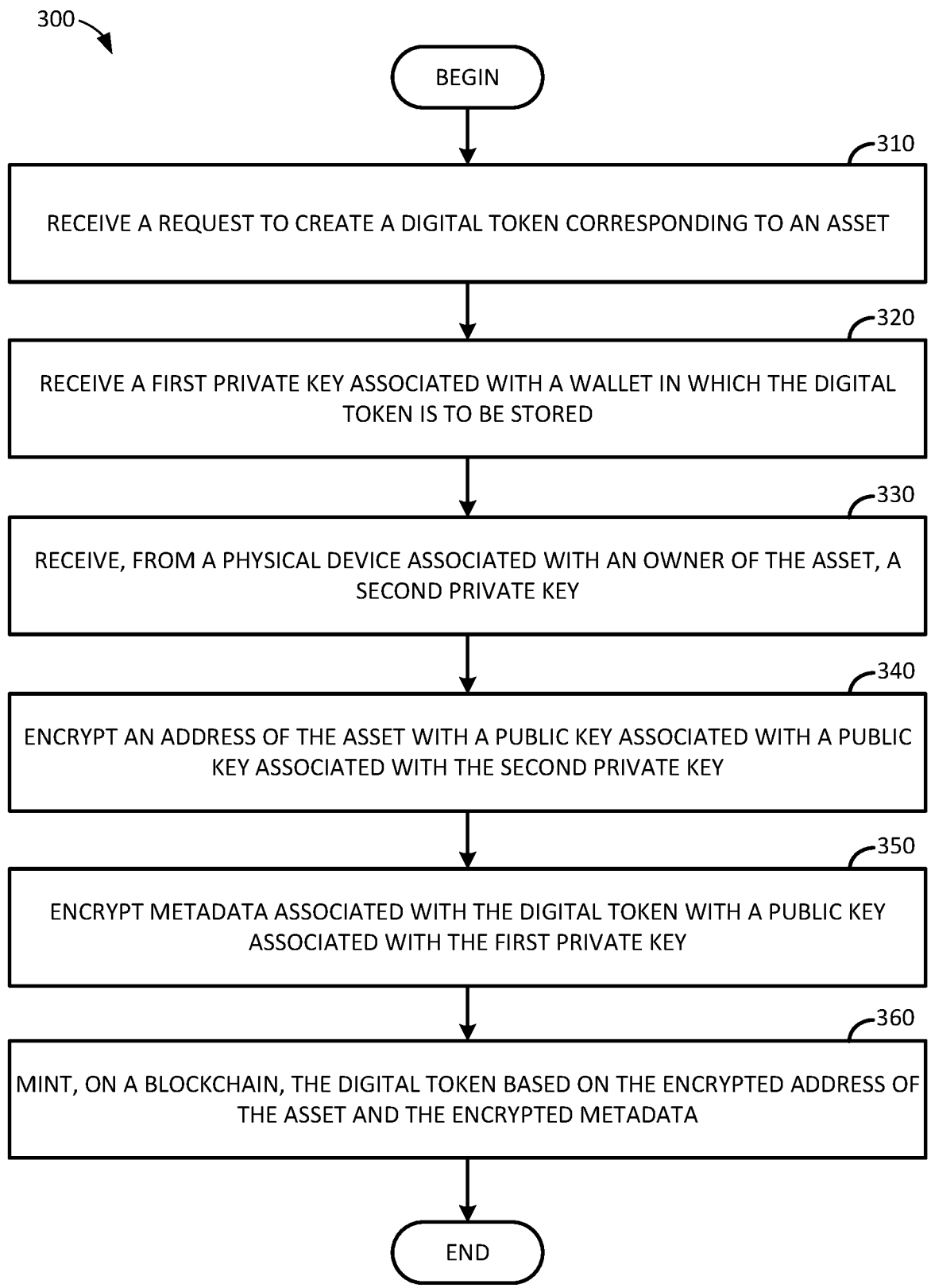
FIG. 3 illustrates example operations for generating digital tokens corresponding to other assets based on physical device identifiers.

FIG. 3 illustrates example operations 300 for generating digital tokens corresponding to other physical or digital assets based on physical device identifiers, according to aspects of the present disclosure. The operations described herein may be performed, for example, by token generator 112 illustrated in FIG. 1.

As illustrated, operations 300 may begin at block 310, where a request to create a digital token corresponding to an asset is received (e.g., at a token generator, such as token generator 112 illustrated in FIG. 1). Generally, the request to create the digital asset may include information identifying a location at which the corresponding asset is stored, such as a URL or URI for digital assets or a physical location and access information for a physical asset. The corresponding asset may be a digital asset, such as a document or repository of sensitive information, digital artwork, or the like, a digital counterpart of a physical asset, such as a digital certificate associated with a physical asset, or a physical asset itself.

At block 320, a first private key is received (e.g., at a token generator, such as token generator 112 illustrated in FIG. 1). Block 320 may correspond to wallet key entry stage 210 illustrated in FIG. 2. The first private key may be associated with a wallet in which the digital token is to be stored. A token generator can use various key generation mechanisms to generate a first public key which may be used to encrypt data that can then be decrypted using the first private key.

At block 330, a second private key is received (e.g., at a token generator, such as token generator 112 illustrated in FIG. 1). Block 330 may correspond to physical identifier entry stage 220 illustrated in FIG. 2. The second private key may be received from a physical device associated with an owner of the asset.

In some aspects, the second private key may be received via scanning or otherwise reading data from the physical device associated with the owner of the asset via a wired or wireless connection. A wireless connection by which the second private key may be received may include, for example, an NFC connection, a connection generated by a RFID tag, a BLE connection, or the like. Alternatively, the second private key may be manually entered into a data entry form and provided to the token generator.

The private key may include various physical identifiers associated with the physical device. For example, a physical identifier may include an identifier of an NFC chip on the physical device, an identifier of an RFID tag on the physical device, or the like. In another example, the physical identifier may be various identifiers associated with a mobile device (e.g., a cellular phone) through which the digital token is being created. These identifiers may include a serial number of the physical device, an ICCID number or other identifier of the SIM installed in the physical device, an IMEI associated with the physical device, or other globally unique identifier.

At block 340, an address of the asset is encrypted with a public key associated with the second private key (e.g., at a token generator, such as token generator 112 illustrated in FIG. 1). Block 340 may correspond to asset address encryption stage 240 illustrated in FIG. 2.

At block 350, metadata associated with the digital token is encrypted with a public key associated with the first private key (e.g., at a token generator, such as token generator 112 illustrated in FIG. 1). Block 350 may correspond to metadata encryption stage 230 illustrated in FIG. 2.

At block 360, the digital token is minted on a blockchain. The digital token may be minted based on the encrypted address of the asset and the encrypted metadata. In some examples, where the digital token conforms to the Ethereum Request for Comments 1155 (ERC-1155) standard, the encrypted address of the asset may be stored in the tokenURI field, and the encrypted metadata may be stored in various metadata fields in the digital token.

The digital token may be, in some aspects, an NFT having ownership records maintained on a blockchain. In such a case, the digital token may represent a specific asset and may not be interchangeable with other digital tokens representing other assets.

In some aspects, after the digital token is minted on the blockchain, the digital token may be committed to the wallet. In committing the digital token to the wallet, a reference to the digital token may be written to the wallet. The reference to the digital token may identify a location in the blockchain (or in some other storage network) at which the digital token may be located, and the owner of the wallet can use this information to access the digital token, view the metadata stored in the digital token, access the location of the asset associated with the digital token, and so on.

As discussed, because the encrypted address of the asset and the encrypted metadata are encrypted using different keys, compromising one key may not allow a malicious user to obtain a usable version of the digital token and the underlying asset associated with the digital token. Further, because different keys are used to separately encrypt data stored in a digital token, additional computational complexity may be introduced into attempts to decrypt the digital token.

For example, assume that different 128 bit keys are used to encrypt the metadata and the address of the asset. In such a case, the digital token may be broken by decrypting the metadata using $2^{128}$ keys and separately decrypting the address of the underlying asset using $2^{128}$ keys. Even if one key is compromised, decrypting the data encrypted using the other key may necessitate $2^{128}$ decryption operations in a brute force attack, which may be a computationally impossible problem to solve in a reasonable amount of time.

In some aspects, the metadata associated with the digital token may include a URI identifying a location at which the digital asset is stored.

In some aspects, the metadata associated with the digital token may include private data used to generate public data stored in the digital asset.

In some aspects, the metadata associated with the digital token may include public data generated from private data stored in the digital asset.

In some aspects, to view the digital asset, a request to view the digital asset may be received, along with the second private key. The digital token may be retrieved (e.g., from the blockchain), and the encrypted address in the digital token may be decrypted using the second private key. The decrypted address of the asset corresponding to the digital token and the encrypted metadata in the digital token may be returned. The encrypted metadata in the digital token may be decryptable using the first private key.

In some aspects, a request to transfer the digital token from the wallet to a second wallet may be received. A public key associated with the second wallet and a public key of the second physical device to be associated with the digital token may be requested. Based on the first private key, the second private key, the public key associated with the second wallet, and the public key of the second physical device, ownership of the digital token is transferred to a user associated with the second wallet. To transfer ownership, the digital token may be decrypted using the first private key and the second private key, and then re-encrypted using the public key associated with the second wallet and the public key of the second physical device. A new record may subsequently be written to the blockchain evidencing the transfer of the digital token to the owner of the second wallet. Further, because the digital token has been re-encrypted using a new set of keys, the previous owner of the digital token may no longer be able to decrypt and view the metadata in the digital token and the address at which the asset associated with the token is located.

Example Secure Key Exchange for Generating and Maintaining Digital Tokens Based on Physical Device Identifiers As discussed above, the generation and transfer of digital tokens associated with other assets may involve the use of multiple cryptographic keys in order to commit these digital tokens to a blockchain, access these digital tokens, and transfer ownership of these digital tokens. To enforce security on digital tokens and prevent, or at least mitigate the risk of, unauthorized creation or duplication of digital tokens, various key exchange mechanisms can be used to protect the keys used to encrypt digital tokens and verify that users have permission to access these digital tokens.

Cryptographic keys generally differ in structure based on whether such keys are used in symmetric or asymmetric encryption schemes. In a symmetric encryption scheme, the same key is used to encrypt and decrypt data. In contrast, in an asymmetric encryption scheme, two keys exist: a private key and a public key. Encryption may generally be performed using the public key, while decryption may be performed using the private key. Because the public key is generally known, any party can encrypt data, but only the holder of the corresponding private key can decrypt data encrypted using the public key. Because cryptographic keys allow for access to encrypted data, these cryptographic keys are generally exchanged in such a manner that third parties are unable to perform a "man-in-the-middle" attack to capture these keys.

Aspects of the present disclosure provide techniques for securely exchanging keys used in generating, encrypting, and decrypting digital tokens associated with other assets. Multiple keys can be used to protect digital tokens committed on the blockchain such that proof of ownership (or at least possession) of more than one key in order to decrypt and access an encrypted version of the digital token (or other digital counterpart to some other asset). Further, one or more keys can be stored on tamper-resistant or tamper-proof physical tags (e.g., tamper-proof RFID tags) to further ensure the authenticity and security of both digital tokens and the other assets associated with these physical tokens.

In one example in which a pair of cryptographic key sets are used to secure a digital token, a first key set in the pair of cryptographic key set may be keys used in an asymmetric encryption scheme, and a second key set in the pair of cryptographic key sets may be a key used in a symmetric encryption scheme (or vice versa). To secure a digital token associated with some other asset, a first encrypted payload may be stored in memory on a physical tag attached to or integrated into the other asset. This first encrypted payload may include, for example, a unique identifier of the other asset (e.g., an RFID tag identifier or other physical device or asset identifier) may be secured using a first encryption key and information related to the current owner of the other asset (e.g., a private key associated with a wallet in which a digital token corresponding to the other asset is stored). A second, related, payload may be stored on-chain to evidence ownership of the digital token and the assets associated with the digital token. To protect the digital token, the second payload may be encrypted using the second encryption key set. In some aspects, the second payload may be encrypted using the public key component of the second encryption key set so that only the holder of the private key component of the second encryption key set can decrypt and access the digital token.

Figure 4:
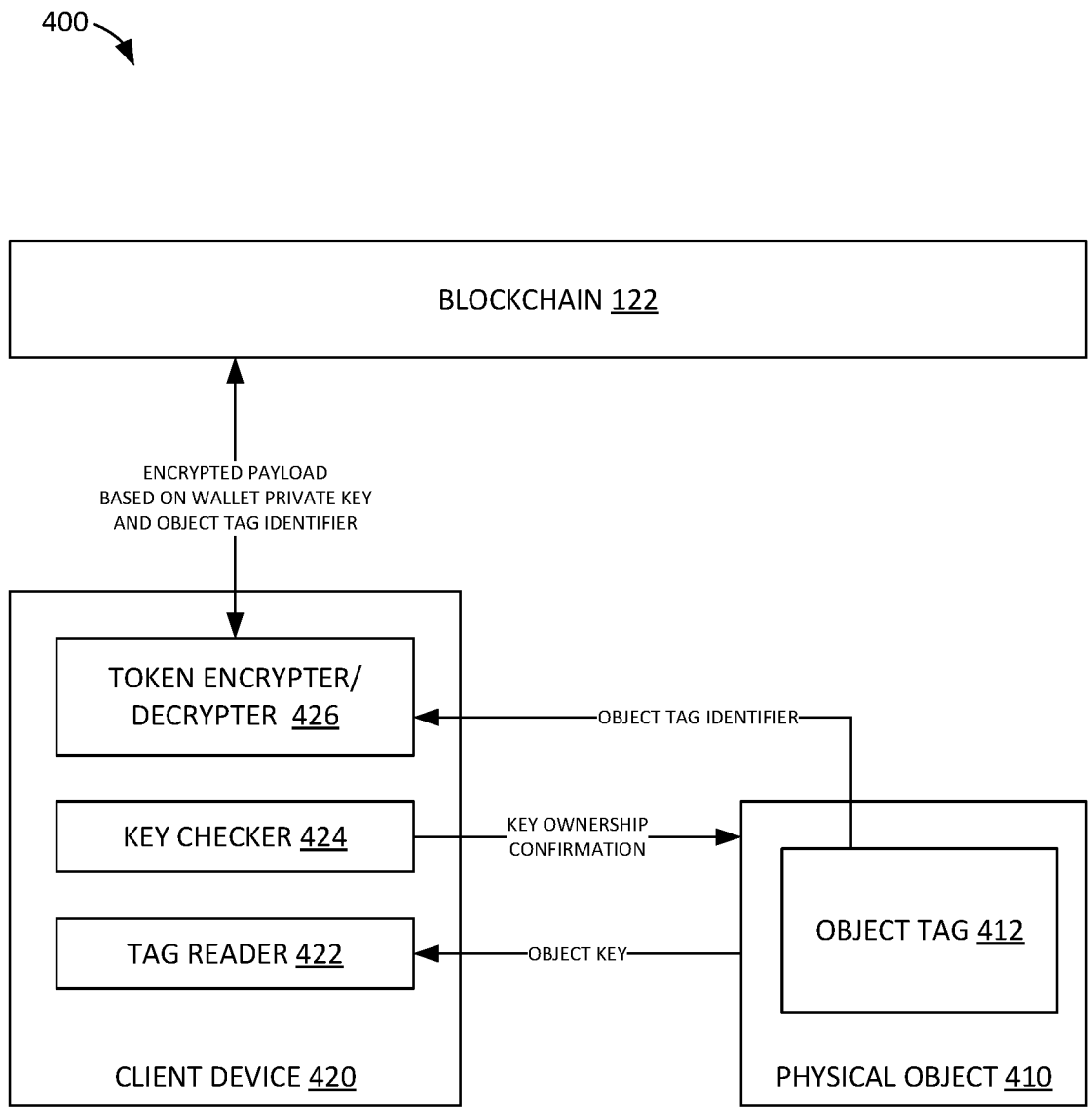
FIG. 4 illustrates an example pipeline for securely accessing digital tokens corresponding to other assets based on physical device identifiers.

FIG. 4 illustrates an example pipeline 400 for securely generating and accessing digital tokens corresponding to other assets based on physical device identifiers.

As illustrated, pipeline 400 includes a physical object 410, client device 420, and blockchain 122 communicatively coupled to each other. Physical object 410 may be an object having an associated digital token for which records are stored on blockchain 122. Physical object 410 may be, for example, a collectible object, physical documents, electronic data storage devices on which sensitive data is stored, or other objects for which digital counterparts exist and are maintained on a blockchain.

To create a digital token, the use of a specific encryption key may be confirmed between physical object 410 and client device 420 via tag reader 422. To do so, physical object 410 may transmit, via object tag 412, an encrypted payload including known or otherwise confirmable data, such as information identifying the physical object 410 (e.g., a serial number or other unique identifier of the physical object 410 or object tag 412). Tag reader 422 can receive (or read) this encrypted payload and use one or more keys to attempt to decrypt the encrypted payload. If the encrypted payload is successfully decrypted (e.g., the payload matches some known or otherwise confirmable data) using a cryptographic key, client device 420 can use the cryptographic key to encrypt a payload for storage on physical object 410. The encrypted payload stored on physical object 410 may, in some aspects, include a private key associated with an owner or user of client device 420 (which may be the private key component of a public-private key pair used in an asymmetric encryption scheme) and an identifier associated with physical object 410.

Client device 420 additionally generates an encrypted payload to be committed to the blockchain 122. The encrypted payload may include, for example, the digital token (or a locator allowing access to the digital token) and the identifier associated with the physical object 410. To protect the digital token, the encrypted payload and other data committed to the blockchain 122 may be encrypted using a public key associated with the wallet in which the digital token is to be stored. As discussed, because the corresponding private key is generally kept private and should only be accessible to the owner of the wallet, the encrypted payload may generally not be recoverable by parties other than the owner of the wallet.

To access the digital token (e.g., for transfer from one owner to a new owner), like with creating the digital token, the use of a specific encryption key may be confirmed between physical object 410 and client device 420 via tag reader 422. Key checker 424 uses the specific encryption key to derive the values of the wallet private key and the identifier of physical object 410. If key checker 424 determines that the wallet private key derived from the encryption key provided by physical object 410 matches a known wallet private key (e.g., the private key owned by the user of client device 420), key checker 424 can determine that the user of client device 420 has possession of both the key needed to confirm ownership of the digital token and the other assets associated with the digital token (e.g., by being able to decrypt an encrypted payload from physical object 410 or being able to derive a wallet private key from a symmetric key used by physical object 410 to encrypt a payload) and the key needed to decrypt the digital token.

Key checker 424 can provide information confirming ownership (or at least possession) of both keys needed to confirm ownership of the digital token and decrypt the digital token to physical device 410. Based on receiving this confirmation information, physical device 410 can provide the identifier of the physical device to client device 410. Generally, as discussed, the identifier of the physical device may be a serial number of the physical device 410, an identifier of a subscriber identification module (SIM) associated with the physical device 410 (e.g., an Integrated Circuit Card Identification (ICCID) number), an International Mobile Equipment Identity (IMEI) associated with the physical device, an identifier of an RFID module (e.g., object tag 412) associated with the physical device 410, or the like. In some aspects, the confirmation information provided to physical device 410 may be binary indications that the client device 420 has ownership (or at least possession) of the appropriate keys, encrypted payloads decryptable by the physical device 410, signed payloads which can be verified by the physical device 410, or other data evidencing ownership (or possession) of the appropriate keys involved in securing the digital token on blockchain 122.

Token encrypter/decrypter 426 can retrieve an encrypted payload from blockchain 122 including the digital token. In some aspects, the encrypted payload may include an encrypted uniform resource indicator (URI) and an encrypted version of the identifier of physical device 410. Using the wallet private key, token encrypter/decrypter 426 can attempt to decrypt the encrypted payload. If the data resulting from an attempt to decrypt the encrypted payload resolves to unintelligible data, the user of client device 420 may not be able to access the digital token stored on blockchain 122. If, however, decrypting the encrypted payload resolves to valid data and the decrypted identifier of physical device 410 matches the actual identifier of physical device 410, ownership of the physical device 410 and associated digital token may be confirmed.

Subsequently, a user of client device 420 can access the digital token and provide information about the physical device and the digital token to a transferee party. The transferee party can negotiate a key to use to confirm future ownership of the physical object 410 and the digital token associated with the physical object 410 and generate and commit encrypted payloads to the physical object 410 (e.g., on object tag 412) and blockchain 122.

While tag reader 422, key checker 424, and token encrypter/decrypter 426 are illustrated as separate components, it should be recognized by one of ordinary skill in the art that these components may be separate or combined into one or more other components. In some aspects, tag reader 422, key checker 424, and token encrypter/decrypter 426 may be deployed as components in one or more of token generator 112, token retriever 114, and/or token transferor 116 of token processing system 110 illustrated in FIG. 1.

Figure 5:
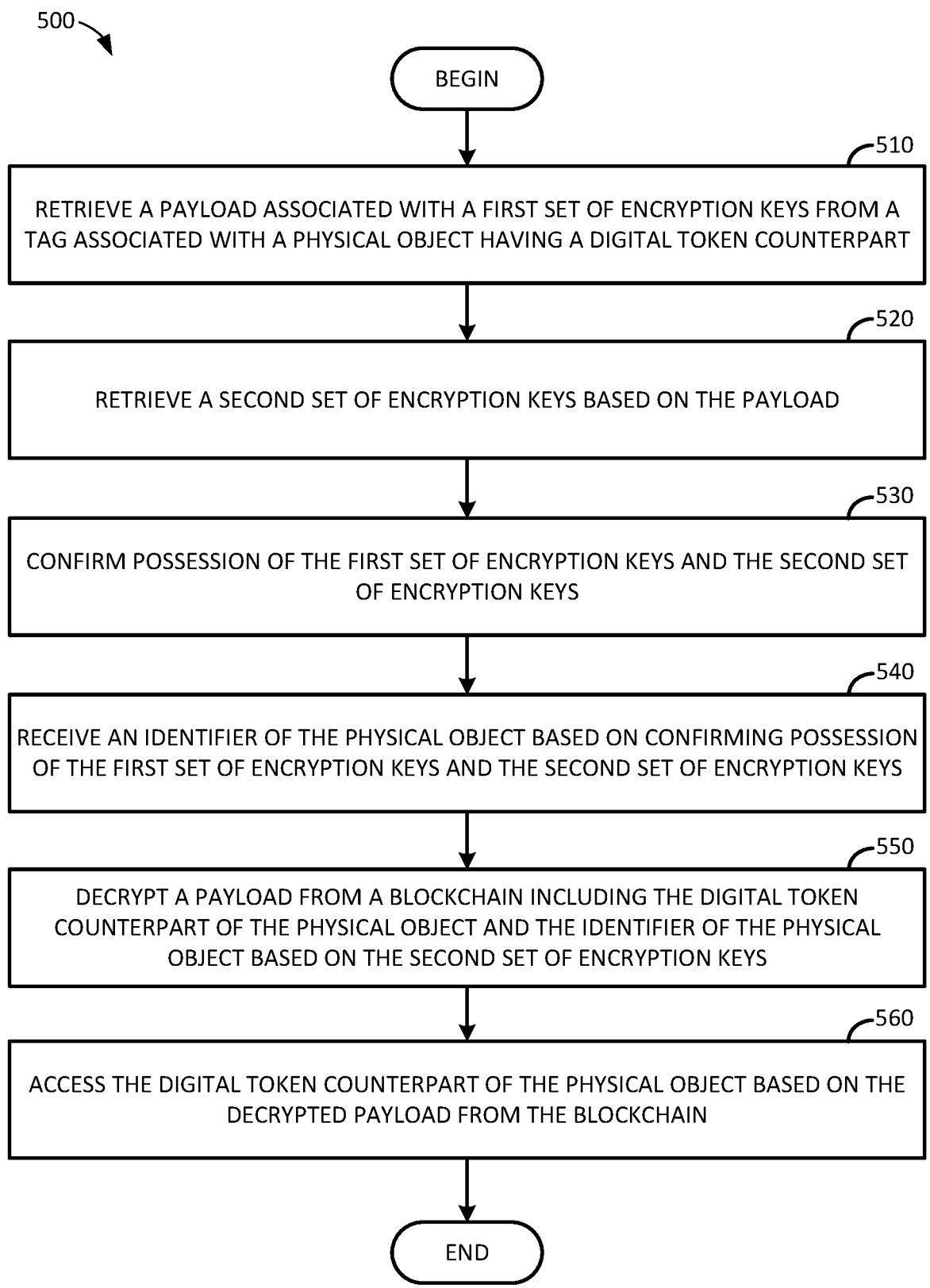
FIG. 5 illustrates example operations for securely accessing digital tokens corresponding to other assets to a blockchain.

FIG. 5 illustrates example operations 500 for securely accessing digital tokens corresponding to other assets to a blockchain. Operations 500 described herein may be performed, for example, by token generator 112 illustrated in FIG. 1, client device 420 illustrated in FIG. 4, or the like.

As illustrated, operations 500 begin at block 510, with retrieving a payload associated with a first set of encryption keys from a tag associated with a physical object having a digital token counterpart. In some aspects, the payload may be encrypted using a first set of encryption keys and include information about a decryption key for an encrypted payload including information about the digital token and information identifying the physical object. The tag may be, for example, an RFID tag on which the payload is stored and which can be updated as ownership of the physical object and the digital token counterpart are transferred. In some aspects, the payload may be a first set of encryption keys based on which other data usable in accessing the digital token counterpart to the physical object.

At block 520, operations 500 proceed with retrieving a second set of encryption keys and the identifier of the physical object based on the retrieved payload. In some aspects, the payload may be decrypted using the appropriate decryption key corresponding with the encryption key used to encrypt the payload. Where the payload is encrypted using a symmetric encryption scheme, the encryption key and decryption key may be the same key. Where the payload is encrypted using an asymmetric encryption scheme, the encryption key may be a public key, and the decryption key may be a corresponding private key.

In some aspects, the payload may include a key or other data which can be provided as input into a key derivation function. The key derivation function may be a function designed to generate one or more keys based on an input (and other data, such as cryptographic salts or the like).

At block 530, operations 500 proceed with confirming possession of the first set of encryption keys and the second set of encryption keys. In some aspects, possession of the first set of encryption keys and the second set of encryption keys may be confirmed with the physical device.

At block 540, operations 500 proceed with receiving an identifier of the physical object based on confirming possession of the first set of encryption keys and the second set of encryption keys.

At block 550, operations 500 proceed with decrypting a payload from a blockchain including the digital token counterpart of the physical object and the identifier of the physical token based on the second set of encryption keys. In some aspects, decrypting the payload from the blockchain may include decrypting the encrypted payload using the second set of encryption keys. The decrypted payload may include a URI identifying a location at which the digital token counterpart of the physical token is located and the identifier of the physical object associated with the digital token counterpart.

At block 560, operations 500 proceed with accessing the digital token counterpart of the physical object based on the decrypted payload from the blockchain. In some aspects, to access the digital token counterpart of the physical object, the decrypted identifier of the physical object may be compared to the received identifier of the physical object. If the decrypted identifier of the physical object and the received identifier of the physical object match, it can be confirmed that the holder of the second set of encryption keys is the rightful owner of the physical object and the digital token counterpart. Based on this confirmation, access to the digital token counterpart may be granted. If, however, the decrypted identifier of the physical object and the received identifier of the physical object do not match, it can be confirmed that there is a mismatch between the holder of the second set of encryption keys and the rightful owner of the physical object, and thus, access to the digital token counterpart to the physical object may be blocked.

Figure 6:
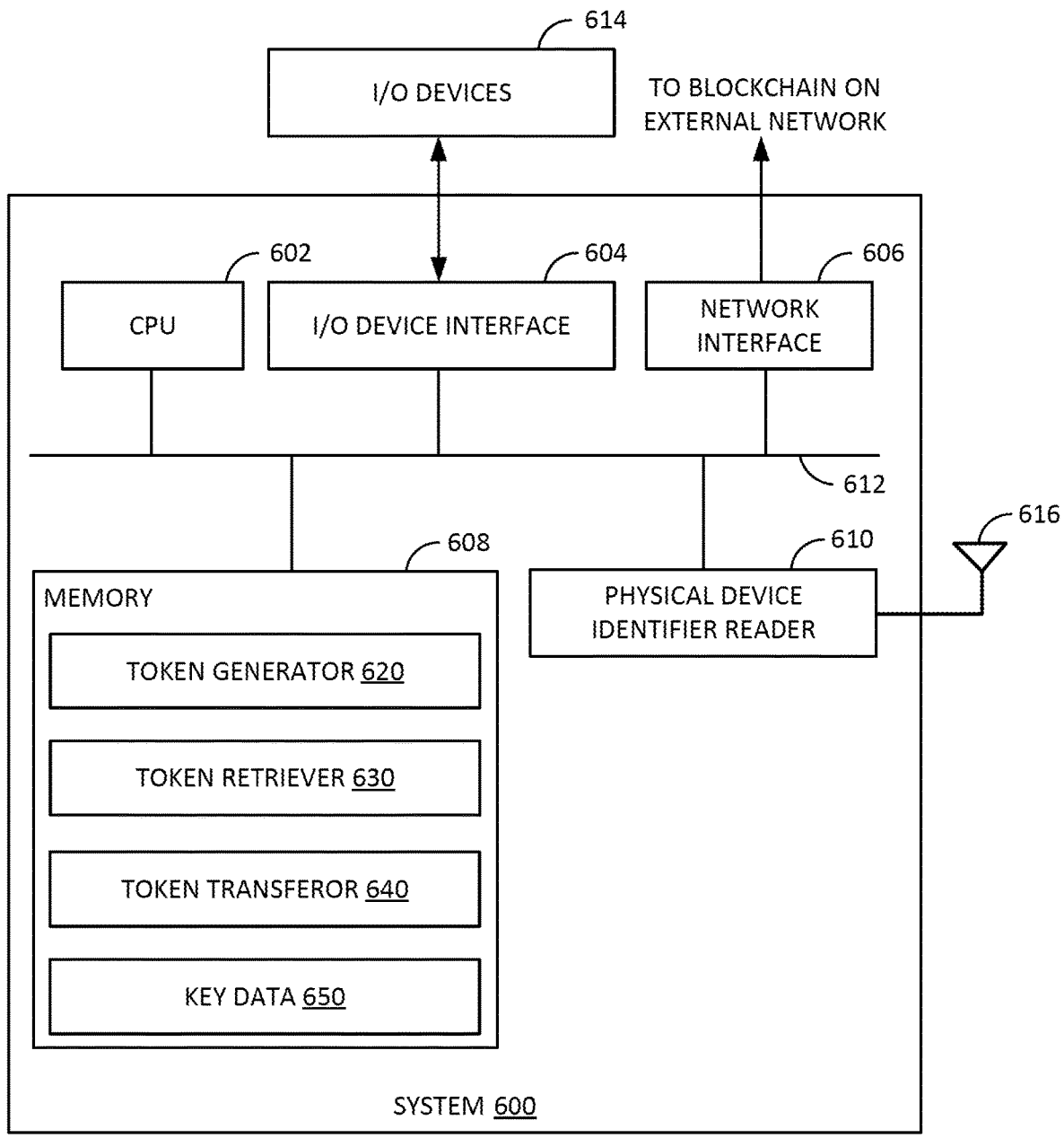
FIG. 6 illustrates an example system on which embodiments of the present disclosure can be performed.

Example System for Generating and Maintaining Digital Tokens Based on Physical Device Identifiers FIG. 6 illustrates an example system 600 configured to perform the methods described herein, including, for example, operations 300 of FIG. 3 and/or operations 500 of FIG. 5. In some embodiments, system 600 may act as a token processing system, such as token processing system 110 illustrated in FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to a network (which may be a local network, an intranet, the internet, or any other group of computing devices communicatively connected to each other), a memory 608, and an interconnect 612. The I/O devices 614 and/or network interface 606 may be used to receive requests to generate, retrieve, and transfer digital tokens on a blockchain.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, and memory 608.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes a token generator 620, token retriever 630, and token transferor 640, and key data store 650.

Token generator 620 may correspond to token generator 112 illustrated in FIG. 1 and allow for the generation of digital tokens corresponding to other assets using a first private key and a second private key. Token generator 620 may receive a first private key, which may be a private key associated with a wallet in which a digital token is to be deposited, and a second private key, which may be a physical identifier of a physical device owned by the owner of the digital token and the underlying asset for which the digital token is to be generated.

In some aspects, the second private key may be obtained by reading the physical identifier of the physical device via a physical device identifier reader 610 and its associated antenna 616, which may allow system 600 to wirelessly read and/or write data via an NFC connection with the physical device, wirelessly read and/or write data stored on an RFID tag, wirelessly read and/or write data via a BLE connection with the physical device, or the like. In some aspects, the second private key may be obtained via manual entry of the physical identifier of the physical device through an I/O device 614 via I/O device interface 604.

Public keys may be derived from the first key and second key, and token generator 620 can use the public keys to separately encrypt the metadata for the digital token and the location at which the underlying asset may be accessed. The digital token, including the separately encrypted metadata and location information, may be minted, and a record may be committed to a blockchain on an external network, via network interface 606, evidencing the creation of the digital token and initial ownership of the digital token and the underlying asset by the owner of the wallet.

Token retriever 630 may correspond to token retriever 114 illustrated in FIG. 1. Generally, token retriever 630 may allow for the owner of a digital token or designed persons having both the first and second private keys to retrieve the digital token and decrypt the location information and metadata stored in the digital token. Encrypted information may remain encrypted while in transit from token retriever 630 to a remote client device (e.g., via network interface 606) so that the security of the data stored in the digital token may be maintained.

Token transferor 640 may correspond to token transferor 116 illustrated in FIG. 1 and may allow the owner of a digital token and the underlying asset to transfer ownership of the digital token and underlying asset to a transferee, or new owner. To do so, token transferor 640 may request the private keys of the transferor and the public keys of the transferee. The private keys of the transferor (e.g., the private key for the transferor's wallet and the physical identifier of the transferor's physical device) may be used to decrypt the metadata and the address information for the underlying asset, and the public keys of the transferee may be used to re-encrypt the metadata and address information for the underlying asset. Token transferor 640 may then generate a record for commitment to a blockchain on an external network, via network interface 606, evidencing the transfer of ownership of the digital token from the transferor to the transferee.

In some aspects, the first private key may be stored in a key data store 650 in memory 608. Key data store 650 may allow for various encryption and/or decryption keys (e.g., public and/or private keys) to be securely maintained on system 600 for use by token generator 620 to encrypt the metadata in a digital token and for use by token retriever 630 and token transferor 640 to decrypt the metadata in the digital token. To provide for additional security, the second private key and the second public key may not be stored in key data store 650 to require presentation of the second private key and the second public key for generation, viewing, and transfer of digital tokens. By not storing the second private key and the second public key in key data store 650, compromising system 600 may still not allow malicious users to take action with respect to digital tokens owned by the owner of system 600, as these malicious users may still not have access to the keys needed to decrypt the address at which the underlying assets associated with the digital tokens are located.

Example Clauses

Implementation examples are described in the following numbered clauses:

Clause 1: A method, comprising: receiving a request to create a digital token corresponding to an asset; receiving a first private key associated with a wallet in which the digital token is to be stored; receiving, from a physical device associated with an owner of the asset, a second private key; encrypting an address of the asset with a public key associated with the second private key; encrypting metadata associated with the digital token with a public key associated with the first private key; and minting, on a blockchain, the digital token based on the encrypted address of the asset and the encrypted metadata.

Clause 2: The method of Clause 1, wherein receiving the second private key comprises reading an identifier of the physical device via a Near Field Communication (NFC) data connection.

Clause 3: The method of Clause 2, wherein the identifier of the physical device comprises an identifier of an NFC chip on the physical device.

Clause 4: The method of any one of Clauses 1 through 3, wherein receiving the second private key comprises receiving entry of an identifier associated with the physical device.

Clause 5: The method of Clause 4, wherein the identifier comprises a serial number associated of the physical device associated with the owner of the asset.

Clause 6: The method of any one of Clauses 4 or 5, wherein the identifier comprises an identifier of a subscriber identification module (SIM).

Clause 7: The method of any one of Clauses 4 through 6, wherein the identifier comprises an International Mobile Equipment Identity (IMEI) associated with the physical device.

Clause 8: The method of any one of Clauses 4 through 7, wherein the identifier comprises an identifier of a radio frequency identifier (RFID) module of the physical device.

Clause 9: The method of any one of Clauses 1 through 8, wherein the metadata associated with the digital token comprises a uniform resource indicator (URI) identifying a location at which the asset is stored.

Clause 10: The method of any one of Clauses 1 through 9, wherein the metadata associated with the digital token comprises private data used to generate public data stored in the asset.

Clause 11: The method of any one of Clauses 1 through 10, further comprising: receiving a request to view the asset; receiving the second private key; retrieving the digital token; decrypting the encrypted address of the asset from the digital token using the second private key; and returning the decrypted address of the asset and the encrypted metadata in the digital token as a set of public key hashes decryptable using the first private key.

Clause 12: The method of Clause 11, wherein receiving the second private key comprises reading an identifier of the physical device via a Near Field Communication (NFC) data connection.

Clause 13: The method of any one of Clauses 1 through 12, further comprising: receiving a request to transfer the digital token from the wallet to a second wallet; requesting a public key associated with the second wallet and a public key of a second physical device to be associated with the digital token; and based on the first private key, the second private key, the public key associated with the second wallet, and the public key of the second physical device, transferring ownership of the digital token to a user associated with the second wallet.

Clause 14: The method of any one of Clauses 1 through 13, wherein the digital token comprises a non-fungible token (NFT) having ownership records maintained on a blockchain.

Clause 15: The method of any one of Clauses 1 through 14, further comprising committing the digital token to the wallet.

Clause 16: A processor-implemented method, comprising: retrieving a payload associated with a first set of encryption keys from a tag associated with a physical object having a digital token counterpart; retrieving a second set of encryption keys and an identifier of the physical object based on the retrieved payload; confirming possession of the first set of encryption keys and the second set of encryption keys; receiving an identifier of the physical object based on confirming possession of the first set of encryption keys and the second set of encryption keys; decrypting a payload from a blockchain including the digital token counterpart of the physical object and the identifier of the physical token based on the second set of encryption keys; and accessing the digital token counterpart of the physical object based on the decrypted payload from the blockchain.

Clause 17: The method of Clause 16, wherein the payload associated with the first set of encryption keys comprises the second set of encryption keys and the identifier of the physical object encrypted using the first set of encryption keys.

Clause 18: The method of any one of Clauses 16 or 17, wherein the first set of encryption keys comprises keys used in a symmetric encryption scheme.

Clause 19: The method of any one of Clauses 16 through 18, wherein retrieving the second set of encryption keys and the identifier of the physical object comprises decrypting the retrieved payload based on the first set of encryption keys.

Clause 20: The method of any one of Clauses 16 through 19, wherein the second set of encryption keys comprises a private key counterpart to a public key used to encrypt the payload from the blockchain including the digital token counterpart of the physical object and the identifier of the physical object.

Clause 21: The method of any one of Clauses 16 through 20, wherein confirming possession of the first set of encryption keys and the second set of encryption keys comprises: comparing the retrieved second set of encryption keys to a known second set of encryption keys; comparing the retrieved identifier of the physical object to a known identifier of the physical object; and based on determining that the retrieved second set of encryption keys matches the known second set of encryption keys and the retrieved identifier of the physical object matches the known identifier of the physical object, confirming possession of the first set of encryption keys and the second set of encryption keys.

Clause 22: The method of any one of Clauses 16 through 21, wherein confirming possession of the first set of encryption keys and the second set of encryption keys comprises transmitting, to the tag associated with the physical object, an indication that the first set of encryption keys and the second set of encryption keys have been verified.

Clause 23: The method of any one of Clauses 16 through 22, wherein accessing the digital token counterpart of the physical object based on the decrypted payload from the blockchain comprises: determining that a decrypted version of the digital token resolves to intelligible data; determining that the identifier of the physical token decrypted based on the second set of encryption keys matches the received identifier of the physical object; and retrieving the digital token counterpart based on determining that the decrypted version of the digital token resolves to intelligible data and that the identifier of the physical token decrypted based on the second set of encryption keys matches the received identifier of the physical object.

Clause 24: A system, comprising: a memory having executable instructions stored thereon; and a processor configured to execute the executable instructions in order to perform the operations of any one of Clauses 1 through 23.

Clause 25: A system, comprising: means for performing the operations of any one of Clauses 1 through 23.

Clause 26: A non-transitory computer readable medium having instructions stored thereon which, when executed by a processor, causes the processor to perform the operations of any one of Clauses 1 through 23.

ADDITIONAL CONSIDERATIONS

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
   receiving, by a token generator, a request to create a digital token corresponding to an asset;
   receiving, by the token generator, a first private key associated with a wallet in which the digital token is to be stored;
   receiving, by the token generator, a second private key from a physical device associated with an owner of the asset, a second private key;
   encrypting an address of the asset with a public key associated with the second private key;
   encrypting, with the token generator, metadata associated with the digital token with a public key associated with the first private key;
   generating, by the token generator, the digital token based on the encrypted address of the asset and the encrypted metadata; and
   minting, via a network interface, the digital token on a blockchain the digital token based on the encrypted address of the asset and the encrypted metadata.

2. The method of claim 1, wherein receiving the second private key comprises reading receiving an identifier of the physical device via a Near Field Communication (NFC) data connection in communication with the token generator.

3. The method of claim 2, wherein the identifier of the physical device comprises an identifier of an NFC chip on the physical device.

4. The method of claim 1, wherein receiving the second private key comprises receiving, with the token generator, entry of an identifier associated with the physical device.

5. The method of claim 4, wherein the identifier comprises a serial number associated of the physical device associated with the owner of the asset.

6. The method of claim 4, wherein the identifier comprises an identifier of a subscriber identification module (SIM).

7. The method of claim 4, wherein the identifier comprises an International Mobile Equipment Identity (IMEI) associated with the physical device.

8. The method of claim 4, wherein the identifier comprises an identifier of a radio frequency identifier (RFID) module of the physical device.

9. The method of claim 1, wherein the metadata associated with the digital token comprises a uniform resource indicator (URI) identifying a location at which the asset is stored.

10. The method of claim 1, wherein the metadata associated with the digital token comprises private data used to generate public data stored in the asset.

11. The method of claim 1, further comprising:
    receiving a request to view the asset;
    receiving the second private key;
    retrieving the digital token;
    decrypting the encrypted address of the asset from the digital token using the second private key; and
    returning the decrypted address of the asset and the encrypted metadata in the digital token as a set of public key hashes decryptable using the first private key.

12. The method of claim 11, wherein receiving the second private key comprises reading an identifier of the physical device via a Near Field Communication (NFC) data connection.

13. The method of claim 1, further comprising:
    receiving a request to transfer the digital token from the wallet to a second wallet;
    requesting a second wallet public key associated with the second wallet and a second device public key of a second physical device to be associated with the digital token; and
    based on the first private key, the second private key, the second wallet public key associated with the second wallet, and the second device public key of the second physical device, transferring ownership of the digital token to a user associated with the second wallet.

14. The method of claim 1, wherein the digital token comprises a non-fungible token (NFT) having ownership records maintained on the blockchain.

15. The method of claim 1, further comprising committing the digital token to the wallet.

16. A processor-implemented method, comprising:
    receiving, by a token generator, a request to create a digital token corresponding to an asset;
    receiving, by the token generator, a first private key associated with a wallet in which the digital token is to be stored;
    receiving, by the token generator, a second private key corresponding to a physical device via a reader, the second private key associated with an owner of the asset, wherein the reader receives the second private key from one or more of a wired connection or a wireless connection;
    transmitting the second private key between the reader and the token generator;
    encrypting, with the token generator, an address of the asset with a public key associated with the second private key to form an encrypted address;
    encrypting, with the token generator, metadata associated with the digital token to form encrypted metadata, the metadata encrypted with a public key associated with the first private key;
    generating, by the token generator, the digital token based on the encrypted address of the asset and the encrypted metadata; and
    minting, via a network interface, the digital token on a blockchain.

17. The method of claim 16, further comprising:
    committing with the token generator, the digital token to the wallet.

18. The method of claim 16, further comprising:
    transmitting, via the network interface, the encrypted address of the asset and the encrypted metadata to the blockchain.

* * * * *